(No Model.)

K. W. BLACKWELL.
MATERIAL FOR USE IN MOLDS FOR CASTING.

No. 348,105.          Patented Aug. 24, 1886.

Witnesses:
James F. Tobin
William F. Davis

Inventor
Kennet W. Blackwell
by his Attorneys
Howson and

United States Patent Office.

KENNET W. BLACKWELL, OF MONTREAL, QUEBEC, CANADA.

MATERIAL FOR USE IN MOLDS FOR CASTING.

SPECIFICATION forming part of Letters Patent No. 348,105, dated August 24, 1886.

Application filed April 26, 1886. Serial No. 200,116. (No specimens.)

*To all whom it may concern:*

Be it known that I, KENNET W. BLACKWELL, a subject of the Queen of Great Britain and Ireland, residing in Montreal, Canada, have invented certain Improvements in Molds for Casting, of which the following is a specification.

The object of my invention is to form a mold for casting metals, more especially steel, that will be at once porous and refractory.

Figure 1:
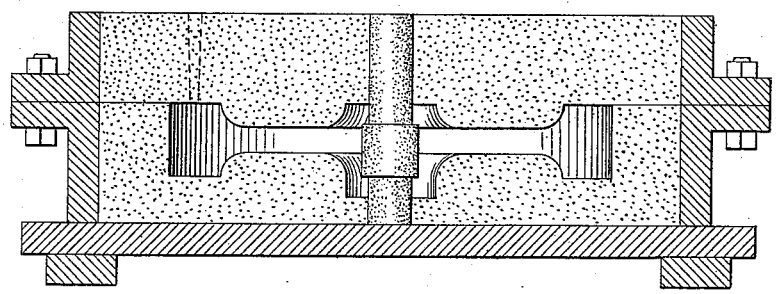
Figure 2:
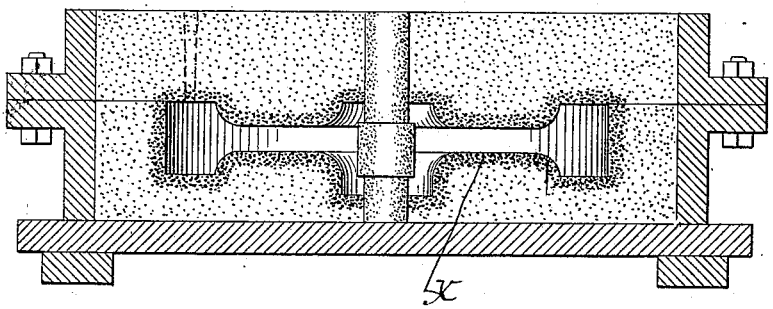

In the accompanying drawings, Figure 1 illutrates a section of a mold, and Fig. 2 is a view of a modification.

In casting steel the common sand molds cannot be used, as the intense heat burns the mold out, and such molds are not sufficiently porous to allow for the free escape of the heated air. A compound consisting of porous material, with a binder of clay or loam, has usually been used; but this is objectionable, because the clay or loam fills up the majority of the pores, and the heated air or gases cannot readily escape, and consequently blow-holes are formed in the casting. The use of glue, molasses, rosin, and similar gummy substances as binders is objectionable on account of their inflammability.

My invention consists of the use as a binder of fossil meal, (infusorial earth pulverized,) which makes, when moistened, an adhesive mass. I mix it with any gritty porous material—such as silica or other sand, ground firebrick, ground carbon, ground plumbago, or other refractory material—in the proportions of about one part of fossil meal to five parts of refractory material. This mixture, when formed into a mold for casting, is porous, and so allows the heated air to escape, and at the same time, being refractory, the mold or core will not be burned away. Cores made of this composition are also easily removed after the operation of casting, as they are then very friable.

In finishing molds and cores of metal and other materials as well as refractory substances, it is desirable to wash, paint, or otherwise coat them to impart a smooth surface thereto. The fossil meal in this case can be used in a fine condition as a binder in connection with the finely-ground refractory materials of which such washers are usually made.

When economy is an object the above described compound can be used as a facing for molds, as shown at $x$ in Fig. 2, instead of making the entire mold of the composition.

My invention may be applied to the casting of ingots, as well as other objects.

Deposits of infusorial earth are found in various sections of the United States, the main source of supply at present being the South Atlantic coast.

I claim as my invention—

1. The herein-described binder for compositions or washes for molds or cores to be used in casting, consisting of fossil meal, (pulverized infusorial earth,) substantially as described.

2. The composition for forming or finishing molds and cores for casting, consisting of ground fossil earth, in combination with ground refractory material, substantially as set forth.

In testimony whereof I have signed my name to this specification in the presence of two subscribing witnesses.

KENNET W. BLACKWELL.

Witnesses:
HENRY HOWSON,
WILLIAM F. DAVIS.